United States Patent
Mueller-Weinfurtner et al.

(10) Patent No.: US 9,225,476 B2
(45) Date of Patent: *Dec. 29, 2015

(54) DYNAMIC HARQ BUFFER MANAGEMENT

(71) Applicant: Unwired Planet, LLC, Reno, NV (US)

(72) Inventors: Stefan Mueller-Weinfurtner, Nuremberg (DE); Steffen Reinhardt, Nuremberg (DE); Udo Wachsmann, Schwabach (DE)

(73) Assignee: UNWIRED PLANET, LLC, Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/276,180

(22) Filed: May 13, 2014

(65) Prior Publication Data

US 2014/0250343 A1 Sep. 4, 2014

Related U.S. Application Data

(63) Continuation of application No. 13/140,668, filed as application No. PCT/EP2008/067852 on Dec. 18, 2008, now Pat. No. 8,751,890.

(51) Int. Cl.
*H04L 1/18* (2006.01)

(52) U.S. Cl.
CPC ............ *H04L 1/1835* (2013.01); *H04L 1/1812* (2013.01); *H04L 1/1822* (2013.01)

(58) Field of Classification Search
CPC .... H04L 1/1835; H04L 1/1822; H04L 1/1812
USPC ................................................. 714/748, 749
See application file for complete search history.

(56) References Cited

U.S. PATENT DOCUMENTS

| | | | |
|---|---|---|---|
| 8,239,721 B2* | 8/2012 | Pelletier et al. | 714/749 |
| 8,286,047 B2* | 10/2012 | Che et al. | 714/751 |
| 2003/0049493 A1 | 3/2003 | Naoe et al. | |
| 2004/0196790 A1 | 10/2004 | Balakrishnan et al. | |

(Continued)

FOREIGN PATENT DOCUMENTS

| | | |
|---|---|---|
| WO | 02/096006 A2 | 11/2002 |
| WO | 2007/078219 A1 | 7/2007 |

OTHER PUBLICATIONS

Karmokar, A.K.; Djonin, D.V.; Bhargava, V.K., "Cross-Layer Rate and Power Adaptation Strategies for IR-HARQ Systems over Fading Channels with Memory: A SMDP-Based Approach," Communications, IEEE Transactions on , vol. 56, No. 8, pp. 1352,1365, Aug. 2008.*

(Continued)

*Primary Examiner* — Cynthia Britt
(74) *Attorney, Agent, or Firm* — Nixon & Vanderhye, P.C.

(57) ABSTRACT

A communication device (100) for communicating in accordance with a hybrid automatic repeat request protocol, the communication device (100) comprising a receiving unit (102) adapted for receiving a communication message including soft-bit values, the soft-bit values representing reliability information for received verification data verifying proper transmission of the communication message, a storage unit (104) adapted for storing the soft-bit values, and a storage management unit (106) adapted for dynamically managing storage of the soft-bit values in the storage unit (104) so that soft-bit values failing to fulfill at least one relevance criteria are not maintained in the storage unit (104).

25 Claims, 12 Drawing Sheets

(56) References Cited

U.S. PATENT DOCUMENTS

| | | | |
|---|---|---|---|
| 2004/0252798 | A1 | 12/2004 | Chang et al. |
| 2007/0209865 | A1 | 9/2007 | Kokosalakis et al. |
| 2008/0225729 | A1 | 9/2008 | Kolding et al. |
| 2008/0304503 | A1 | 12/2008 | Blake |
| 2009/0067335 | A1 | 3/2009 | Pelletier et al. |
| 2009/0086756 | A1 | 4/2009 | Tseng |
| 2009/0319861 | A1 | 12/2009 | Shron et al. |
| 2010/0050034 | A1* | 2/2010 | Che et al. .......... 714/748 |
| 2010/0296427 | A1 | 11/2010 | Lohr et al. |
| 2011/0239075 | A1 | 9/2011 | Xu et al. |
| 2012/0195398 | A1 | 8/2012 | Shen et al. |
| 2013/0148569 | A1 | 6/2013 | Larsson |

OTHER PUBLICATIONS

Yang Gao; Guangjie Li; Kuilin Chen; Hongming Zheng; Xiaoyun Wu, "Novel MIMO HARQ Schemes Jointly Utilizing Chase Combining," Communication Technology, 2006. ICCT '06. International Conference on , vol., No., pp. 1,5, Nov. 27-30, 2006.*

3GPP TS 36.213 V8.0.0, $3^{rd}$ Generation Partnership Project; Technical Specification Group Radio Access Network; Evolved Universal Terrestrial Radio Access (E-UTRA); Physical Layer Procedures (Release 8) (Sep. 2007).

3GPP TS 36.306, $3^{rd}$ Generation Partnership Project; Technical Specification Group Radio Access Network; Evolved Universal Terrestrial Radio Access (E-UTRA); User Equipment (UE) Radio Access Capabilities (Release 8) (Dec. 2007).

3GPP TS 36.212, V8.0.0, $3^{rd}$ Generation Partnership Project; Technical Specification Group Radio Access Network; Evolved Universal Terrestrial Radio Access (E-UTRA); Multiplexing and Channel Coding (Release 8) (Sep. 2007).

3GPP TS 36.211 V8.4.0, $3^{rd}$ Generation Partnership Project; Technical Specification Group Radio Access Network; Evolved Universal Terrestrial Radio Access (E-UTRA); Physical Channels and Modulation (Release 8), (Sep. 2008).

International Search Report mailed Jul. 19, 2010 in PCT Application PCT/EP2008/067852.

Chase, "Code Combining—A Maximum/Likelihood Decoding Approach for Combining an Arbitrary Number of Noisy Packets", IEEE Transactions on Communications, vol. 33, No. 5, pp. 385-393, May 1985.

* cited by examiner

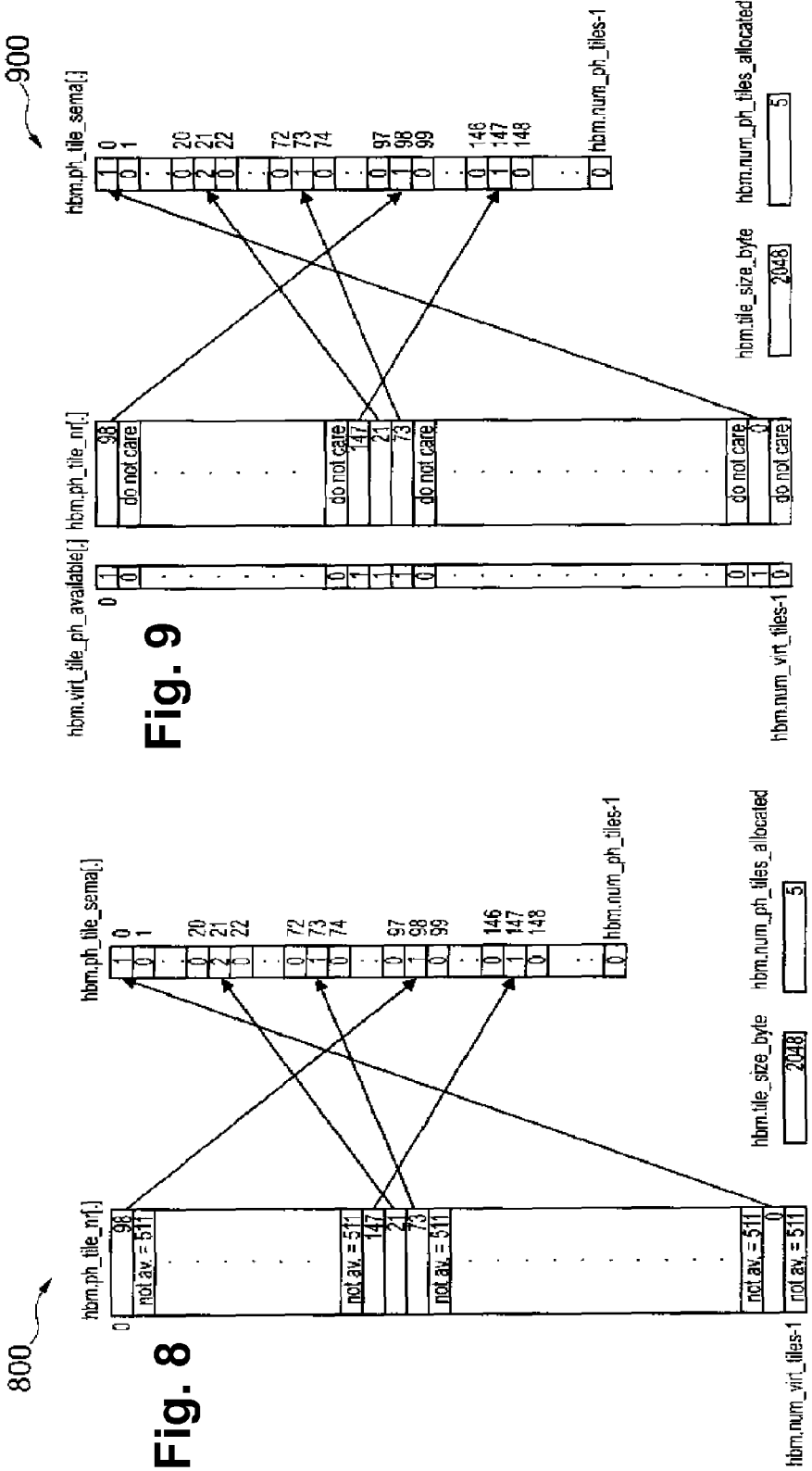

```
% Initialize the HARQ Buffer Manager (HBM).
%
% hbm = HBM_init( num_bytes, tile_size_byte, num_ph_tiles )
%
%%% Input:
% num_bytes: total number of bytes in virtual address range of HARQ buffer
% tile_size_byte: size of one single HARQ tile in byte
% num_ph_tile: number of tiles to be realized as physically available memory
%              This is an optional parameter.
%              If parameter is not given, the full virtual address range
%              is assumed to be physically present.
%
%%% Output:
% hbm: HBM structure
%
% estemue, 11.08.2008
%
function hbm = HBM_init( num_bytes, tile_size_byte, num_ph_tiles )

%%%%% Process the input parameters %%%%%
% save the tile size
hbm.tile_size_byte = tile_size_byte;
% Compute number of tiles needed to cover the virtual address range
hbm.num_virt_tiles = ceil( num_bytes/hbm.tile_size_byte );
% Save or set the number of physically available tiles
if nargin == 3
   % num_ph_tiles is given and saved
   hbm.num_ph_tiles = num_ph_tiles;
else
   % num_ph_tiles is not given and full memory is assumed
   hbm.num_ph_tiles = hbm.num_virt_tiles;
end %%%%% Reset the HBM state variables %%%%%
% Reset the counter for the number of allocated physically available tiles
hbm.num_ph_tiles_allocated = 0;
% Reset the semaphore vector which shows for each tile in physically
% available memory by how many calls to HBM_alloc it has been allocated
hbm.ph_tile_sema = zeros( 1, hbm.num_ph_tiles );
% Reset the vector with indicators which show
% for each tile in virtual address range that it is physically available
hbm.virt_tile_ph_available = zeros( 1, hbm.num_virt_tiles );
% Reset the mapping table from virtual tile number to physical tile number
hbm.ph_tile_nr = (-1)*ones( 1, hbm.num_virt_tiles ); % -1 for debug only
% Reset the physically available memory
hbm.ph_mem = zeros( 1, hbm.num_ph_tiles*hbm.tile_size_byte );
```

Fig. 10

```
% Allocate physical memory to virtual address range
% in HARQ Buffer Manager (HBM).
% Before actually allocating a physical tile, it is checked whether
% the virtual tile is already available physically due to other allocs.
% If not, it is checked whether physical tiles are still available.
% If so, the physical tile is allocated and assigned to the virtual tile.
%
% hbm = HBM_alloc( hbm, virt_byte_addr_start, block_size_byte )
%
%%% Input:
% hbm: old HBM structure
% virt_byte_addr_start: virtual byte address for start of block
% block_size_byte: block size in byte
%
%%% Output:
% hbm: new HBM structure
%
% estemue, 11.08.2008
%
function hbm = HBM_alloc( hbm, virt_byte_addr_start, block_size_byte )

% Array origin constant, which needs to be 1 in Matlab code and 0 in C code.
ao = 1;

% compute number of virtual tile for start and end of alloc request
virt_tile_nr_start = floor( virt_byte_addr_start / hbm.tile_size_byte );
virt_tile_nr_end   = floor( (virt_byte_addr_start+block_size_byte) ...
                            / hbm.tile_size_byte );

% Reset the search variable for physical tile number
% (Note that for a sequence of calls to HBM_alloc without HBM_release
% in-between, it would be most efficient to declare this variable as
% static with proper wrap-around so that it retains its value
% between calls to this function)
ph_tile_nr = 0;
% loop through the virtual tiles in this alloc request
for virt_tile_nr = virt_tile_nr_start:virt_tile_nr_end,
  if hbm.virt_tile_ph_available(ao+virt_tile_nr) == 1
    % a physical tile is already allocated to virtual tile
    % so that only the semaphore for physical tile needs to be incremented
    ph_tile_nra = hbm.ph_tile_nr(ao+virt_tile_nr);
    hbm.ph_tile_sema(ao+ph_tile_nra) = hbm.ph_tile_sema(ao+ph_tile_nra) + 1;
  else
    % a physical tile needs to be searched and allocated to virtual tile
    if hbm.num_ph_tiles_allocated == hbm.num_ph_tiles
      % all physical tiles are allocated
      warning('HBM_alloc is out of physical memory.');
    else
      % at least one physical tile is available
      % so that this needs to be found and allocated
      while hbm.ph_tile_sema(ao+ph_tile_nr) >= 1
        ph_tile_nr = ph_tile_nr + 1;
      end
      hbm.ph_tile_nr(ao+virt_tile_nr) = ph_tile_nr;
      hbm.num_ph_tiles_allocated = hbm.num_ph_tiles_allocated + 1;
      hbm.virt_tile_ph_available(ao+virt_tile_nr) = 1;
      hbm.ph_tile_sema(ao+ph_tile_nr) = hbm.ph_tile_sema(ao+ph_tile_nr) + 1;
    end
  end
end
```

Fig. 11

```
% Release physical memory from virtual address range
% in HARQ Buffer Manager (HBM).
%
% hbm = HBM_release( hbm, virt_byte_addr_start, block_size_byte )
%
%%% Input:
% hbm: old HBM structure
% virt_byte_addr_start: virtual byte address for start of block
% block_size_byte: block size in byte
%
%%% Output:
% hbm: new HBM structure
%
% estemue, 11.08.2008
%
function hbm = HBM_release( hbm, virt_byte_addr_start, block_size_byte )

% Array origin constant, which needs to be 1 in Matlab code and 0 in C code.
ao = 1;

% compute number of virtual tile for start and end of alloc request
virt_tile_nr_start = floor( virt_byte_addr_start / hbm.tile_size_byte );
virt_tile_nr_end   = floor( (virt_byte_addr_start+block_size_byte) ...
                            / hbm.tile_size_byte );

% loop through the virtual tiles in this release request
for virt_tile_nr = virt_tile_nr_start:virt_tile_nr_end,
  if hbm.virt_tile_ph_available(ao+virt_tile_nr) == 1
    % the virtual tile is physically available
    % so that semaphore for physical tile needs to be decremented
    ph_tile_nr = hbm.ph_tile_nr(ao+virt_tile_nr);
    hbm.ph_tile_sema(ao+ph_tile_nr) = hbm.ph_tile_sema(ao+ph_tile_nr) - 1;
    if hbm.ph_tile_sema(ao+ph_tile_nr) == 0
      % semaphore reached zero so that physical tile is released
      hbm.ph_tile_nr(ao+virt_tile_nr) = -1; % -1 for debug only
      hbm.num_ph_tiles_allocated = hbm.num_ph_tiles_allocated - 1;
      hbm.virt_tile_ph_available(ao+virt_tile_nr) = 0;
    end
  end
end
```

Fig. 12

```
% Write one byte value to the memory managed by HARQ Buffer Manager (HBM).
% Before writing, it is checked whether the virtual tile
% is physically available.
% If not, the value will be dumped.
% If so, the value will be stored.
%
% hbm = HBM_write_mem( hbm, virt_byte_addr, value )
%
%%% Input:
% hbm: old HBM structure
% virt_byte_addr: virtual byte address for value to read
% value: the value to be stored
%
%%% Output:
% hbm: new HBM structure
%
% estemue, 11.08.2008
%
function hbm = HBM_write_mem( hbm, virt_byte_addr, value )

% Array origin constant, which needs to be 1 in Matlab code and 0 in C code.
ao = 1;

%%%%% Address transformation %%%%%
% compute number of virtual tile for write request
virt_tile_nr = floor( virt_byte_addr / hbm.tile_size_byte );
% compute the byte address within tile (equivalent to extracting the LSBs)
byte_addr_in_tile = mod( virt_byte_addr, hbm.tile_size_byte );

%%%%% Memory access control %%%%%
if hbm.virt_tile_ph_available(ao+virt_tile_nr) == 1
   % a physical tile is allocated to virtual tile
   ph_tile_nra = hbm.ph_tile_nr(ao+virt_tile_nr);
   hbm.ph_mem(ao+ph_tile_nra*hbm.tile_size_byte+byte_addr_in_tile ) = value;
end
```

Fig. 13

```
% Read one byte value from the memory managed by HARQ Buffer Manager (HBM).
% Before reading, it is checked whether the virtual tile
% is physically available.
% If not, a zero is returned.
% If so, the actual value is returned.
%
% value = HBM_read_mem( hbm, virt_byte_addr )
%
%%% Input:
% hbm: HBM structure
% virt_byte_addr: virtual byte address for value to read
%
%%% Output:
% value: the value read from the memory
%
% estemue, 11.08.2008
%
function value = HBM_read_mem( hbm, virt_byte_addr )

% Array origin constant, which needs to be 1 in Matlab code and 0 in C code.
ao = 1;

%%%%% Address transformation %%%%%
% compute number of virtual tile for read request
virt_tile_nr = floor( virt_byte_addr / hbm.tile_size_byte );
% compute the byte address within tile (equivalent to extracting the LSBs)
byte_addr_in_tile = mod( virt_byte_addr, hbm.tile_size_byte );

%%%%% Memory access control %%%%%
if hbm.virt_tile_ph_available(ao+virt_tile_nr) == 1
    % a physical tile is allocated to virtual tile
    ph_tile_nra = hbm.ph_tile_nr(ao+virt_tile_nr);
    value = hbm.ph_mem(ao+ph_tile_nra*hbm.tile_size_byte+byte_addr_in_tile );
else
    % no physical tile is allocated to virtual tile so that 0 is returned
    value = 0;
end
```

Fig. 14

DYNAMIC HARQ BUFFER MANAGEMENT

This application is a continuation of U.S. patent application Ser. No. 13/140,668 filed Jul. 25, 2011, pending, which is the National Phase application of PCT Application PCT/EP08/67852 filed Dec. 18, 2008, the entire contents of each of which are hereby incorporated by reference.

TECHNICAL FIELD

The invention relates to a method and a device for buffer management within a communications network. Further, the invention relates to a corresponding program element and computer-readable medium.

BACKGROUND

A "hybrid automatic repeat request" (HARQ) protocol may particularly denote a channel coding architecture for a communication system. In HARQ, a part of data (which had been transmitted properly) from an earlier transmission of a communication message may be combined with another part of data (which had not been transmitted properly previously) from a later re-transmission of the communication message. HARQ may be considered as a variation of an ARQ (automatic repeat request protocol) error control method. In ARQ, error-detection information (ED) bits may be added to data to be transmitted (such as cyclic redundancy check, CRC). In Hybrid ARQ, forward error correction (FEC) bits may also be added to the existing Error Detection (ED) bits (such as Reed-Solomon code or Turbo code). As a result, Hybrid ARQ performs properly even under poor signal conditions.

WO 2007/078219 is based on ARQ in wireless communication systems, wherein a coded message block is spread over a plurality of sub-carriers or components. WO 2007/078219 introduces an equalizing HARQ method. The equalizing HARQ identifies and re-transmits the most distorted parts of a received coded message block. In addition, the re-transmitted parts can optionally be relocated to components of higher quality, which ensures good re-transmission quality for those badly distorted parts in the prior transmission. After a soft-bit combination in a receiving node, the final received codeword experience an equalized quality variation with low multi-state performance loss.

Conventionally, HARQ technology may use a HARQ buffer with a challenging memory requirement.

SUMMARY

It is an object of the invention to provide a HARQ system efficiently managing a HARQ buffer memory.

In order to achieve the object defined above, a communication device, a communication method, a program element, and a computer-readable medium according to the independent claims are provided.

According to an exemplary embodiment of the invention, a communication device for communicating in accordance with a hybrid automatic repeat request (HARQ) protocol is provided, the communication device comprising a receiving unit adapted for receiving a communication message including soft-bit values, the soft-bit values representing reliability information for received verification data verifying proper transmission of the communication message, a storage unit adapted for storing the soft-bit values, and a storage management unit adapted for dynamically managing storage of the soft-bit values in the storage unit so that soft-bit values failing to fulfil (i.e. which do not fulfil) at least one (for instance predefined) relevance criteria are not maintained in the storage unit.

According to still another exemplary embodiment of the invention, a method of communicating in accordance with a hybrid automatic repeat request (HARQ) protocol is provided, the method comprising receiving a communication message including soft-bit values, the soft-bit values representing reliability information for received verification data verifying proper transmission of the communication message, and dynamically managing storage of the soft-bit values in a storage unit (for instance a physical storage unit such as a semiconductor memory) so that soft-bit values failing to fulfil at least one relevance criteria are not maintained in the storage unit.

According to still another exemplary embodiment of the invention, a program element (for instance a software routine, in source code or in executable code) is provided, which, when being executed by a processor (such as a microprocessor or a CPU), is adapted to control or carry out a method having the above mentioned features.

According to yet another exemplary embodiment of the invention, a computer-readable medium (for instance a CD, a DVD, a USB stick, a floppy disk or a harddisk) is provided, in which a computer program is stored which, when being executed by a processor (such as a microprocessor or a CPU), is adapted to control or carry out a method having the above mentioned features.

Data processing which may be performed according to embodiments of the invention can be realized by a computer program, that is by software, or by using one or more special electronic optimization circuits, that is in hardware, or in hybrid form, that is by means of software components and hardware components.

In the context of this application, the term "communication device" may particularly denote a transmitter device, a receiver device or a transmitter/receiver device (transceiver) which allows for a unidirectional or bidirectional exchange of communication messages with a communication partner. Such a communication device may particularly be a wireless communication device, i.e. a communication device which communicates without the necessity of wires. However, wire-based communication is also possible in other embodiments. A communication message (such as a telecommunication message) communicated by such system may include use data (such as acoustic information) and may include verification data (such as forward error correction (FEC) bits and error-detection information (ED) bits, etc., for instance for verifying proper transmission of a communication message or a part thereof). Soft-bit values for the received FEC bits may improve performance during FEC decoding.

The term "hybrid automatic repeat request" (HARQ) protocol may particularly denote a technique for an error-free transmission of data packets of a communication message. Previously erroneously transmitted data packets may be requested to be re-transmitted. A data packet recognized as erroneously transmitted may be stored at least partially and may be further processed after re-transmission of the data packet. HARQ may operate as a stop-and-wait mechanism based on confirmations and negative feedback. Two HARQ communication partner devices (such as a mobile communication terminal and a base station) may communicate via a dedicated communication channel. Examples for communication standards featuring a HARQ protocol are IEEE 802.16 (also known as WiMAX), 3GPP standard universal terrestrial radio access (UTRA), high-speed packet access (HSPA), evolved UTRA (E-UTRA), also denoted as long-term evolution (LTE).

The term "soft-bit values" can be considered as data used in the context of a hybrid automatic repeat request (HARQ) protocol and may particularly denote reliability information for the received FEC bits, i.e., it is possible that the receiver does not decide the FEC bits in a hard fashion to obtain the binary values "0" or "1", but represents the FEC bits by soft-bit values. As one exemplary embodiment, the receiver may resolve each received FEC bit in a four-bit soft-bit value between "−8" (which e.g. represents a very reliable binary "1" for the FEC bit) to "+7" (which e.g. represents a very reliable binary "0" for the FEC bit). Less reliably received FEC bits are close to the soft-bit value "0", which represents indecision for the FEC bit. Usage of soft-bit values instead of hard-decided bits for FEC bits during the FEC decoding process significantly improves performance. More generally, the soft-bit values may be indicative of a reliability of verification data (such as FEC) verifying proper transmission of the communication message.

The term "relevance criteria" may particularly denote any decision criteria based on which management of buffer storage resources can be performed. Such a criteria may be characteristic for or indicative of the relevance of specific soft-bit values for a successful subsequent data processing, particularly for a successful transmission of a complete communication message. Hence, the system may categorize different soft-bit values or groups of soft-bit values within the storage unit as more or less relevant so that a dynamic management of the memory allocation can be performed on the basis of this or these criteria.

The term "dynamically managing storage of the soft-bit values in the storage unit" may particularly denote a memory management architecture for managing limited storage resources efficiently by allowing changes in memory resource allocation over time. Hence, such an architecture may flexibly change a memory allocation, a memory distribution and/or a content stored in a physical memory. Such a dynamic memory management may consider a policy or boundary condition to release or delete stored data portions of a memory which will not (or which will probably not) be needed again for successful data transmission or interpretation. Such a dynamic approach is in contrast to a purely static memory management.

According to an exemplary embodiment, a HARQ communication device may control a storage unit adapted for storing soft-bit values used during a HARQ communication in a dynamic, i.e. time-dependent and variable, manner. Hence, the system may perform an evaluation and an analysis to decide which specific soft-bit values should still be kept stored in a storage device as a basis for a further data processing with the aim to successfully derive information included in a HARQ communication message (for instance in a transport block). A result of the system's evaluation and analysis may also be to decide which specific soft-bit values should not be kept any longer in the storage device. For instance, when a partially successful HARQ processing has been carried out for a received communication message, soft-bit values which have been used for such a partially successful data processing may be deleted from the storage unit to de-allocate corresponding memory portions. In contrast to this, other parts of the communication message may relate to unsuccessfully transmitted data so that the communication message (or a part thereof) may be re-transmitted, and the corresponding soft-bit values may be used later for processing or interpreting such a repeatedly transmitted data block. Therefore, the system may decide that the relevance of soft-bit values for subsequent processing is still sufficiently high and that the corresponding soft-bit values should therefore not be deleted. Such an efficient dynamic updating of the allocation of memory resources of the memory unit may allow to reduce the memory requirements of such a system, thereby allowing to manufacture the storage unit of the communication device and therefore the entire communication device with small size and reasonable cost.

In an embodiment, it is not necessary that all soft-bit values are maintained stored in the memory unit until successful transmission of a complete transport block. In contrast to this, for instance in a scenario of a partially successful transmission of a transport block, only a part of the soft-bit values which could be required later for processing of previously unsuccessfully interpreted parts of a re-transmitted transport block may be kept stored in the memory. Which part of soft-bit values should be stored and which part of soft-bit values can be deleted can be decided by the storage management unit based on one or more relevance criteria indicative of a future relevance of individual soft-bit values or groups thereof for subsequent successful data processing.

In the following, further exemplary embodiments of the communication device will be explained. However, these embodiments also apply to the method, to the program element and to the computer-readable medium.

The communication device may comprise a transmission analysis unit adapted for analyzing whether the communication message has been transmitted successfully and (if necessary or desired) for triggering re-transmission of at least a part of the communication message upon determining that the communication message has not been transmitted successfully. In such an embodiment, the storage management unit may be adapted for managing storage of the soft-bit values in the storage unit in such a manner that soft-bit values associated with a successfully transmitted portion of the communication message are not maintained in the storage unit. Therefore, the dynamic updating of the memory content of the memory unit can be made dependent on a relation between specific soft-bits and portions of a communication message which have been transmitted successfully or non-successfully. Therefore, only soft-bit values may be maintained in the memory which can be used later for interpreting parts of the communication message which have not been transferred successfully in the first trial, and will therefore be needed for combination with (portions of) re-transmitted data. This may allow to reduce the size and storage capacity of the storage unit. In such an embodiment, the relevance criteria may be whether specific soft-bit values might be required later for processing a re-transmitted message or whether their processing tasks have already been used during the previous data processing. In other words, not all soft-bit values have to be maintained stored until a communication message such as a transport block has been transmitted completely successfully.

The transmission analysis unit may be adapted for decoding the communication message based on the included soft-bit values. Hence, the soft-bit values may contribute to decode the communication message or to verify successful decoding so that only soft-bit values have to be maintained in a memory which are subsequently required for decoding purposes. Soft-bit values related to already decoded portions of a message do not have to be maintained and can be deleted from the storage unit.

The storage management unit may be adapted for managing storage of the soft-bit values in the storage unit so that a storage capacity of the memory unit reserved for soft-bit values is released upon determining that these soft-bit values are associated with a successfully transmitted portion of the communication message. In such an embodiment, testing a relevance criteria on soft-bit values may result in the consequence that no longer relevant soft-bit values or those having a relevance below a predefined threshold relevance can be deleted.

Still referring to the above embodiment, the storage management unit may be adapted for managing storage of the soft-bit values in the storage unit so that selectively soft-bit values associated with a non-successfully transmitted portion of the communication message are maintained in the storage unit until determining successful re-transmission of this portion by a subsequent communication message. Soft-bits related to non-successfully transmitted portions of the communication message may therefore be associated with a high relevance value, since these bits are necessary for a subsequent decoding of a repeatedly transmitted communication message.

The storage management unit may be adapted for splitting (or partitioning) a storage capacity of the storage unit into a plurality of storage sections each associated with one of a plurality of hybrid automatic repeat request (HARQ) processes and for dynamically managing the plurality of storage sections. A memory portion may be assigned temporarily to each active HARQ process as a buffer for storing data which the active HARQ process may access. In this description, an active HARQ process may denote a process associated with data currently still being decoded or being in re-transmission, i.e. previous transmissions were unsuccessful at least partially so that specific soft-bit values of the transmission need to be stored in a HARQ buffer for combining with one or more possible later re-transmissions.

More particularly, it is possible that the size (such as the storage capacity) of each of the plurality of storage sections is made variable over time which allows the management unit to introduce one further design parameter for improving or optimizing the allocation of memory resources to different HARQ processes.

In another embodiment, the storage management unit may be adapted for managing a storage capacity of the storage unit by statistically multiplexing a number (particularly a plurality) of active HARQ processes. Therefore, such a multiplexing on the basis of a statistical analysis may allow to significantly reduce the required total memory resources since probabilities may be defined for erroneous transmission of a communication message. The memory can then be dimensioned or allocated in a way that a predefined error rate can still be handled with the assigned memory capacity.

The storage management unit may be adapted for assigning priority classes to parts of the storage unit associated with parts of HARQ processes and for discarding parts of stored data assigned to a low priority class. Therefore, the relevance criteria may be whether the respective soft-bits are more or less prioritized for a specific message transmission. Therefore, soft-bit values associated to less important parts of the communication message may be deleted, whereas more important soft-bits may be maintained. The decision whether specific soft-bit values are considered as sufficiently prioritized to be kept stored, it may be determined whether a corresponding priority value of a soft-bit value is above (maintain stored) or below (delete) a priority threshold.

The storage management unit may be adapted for assigning a probability of successful transmission to parts of the storage unit associated with HARQ processes and for discarding parts assigned to a low probability of successful transmission. Therefore, a sufficiently high probability or likelihood of successful transmission may also be implemented as a relevance criteria for taking a decision regarding the management of the storage of different soft-bit values.

Particularly, the storage management unit may be adapted for refusing storage of zero-valued soft-bit values. Soft-bit values which do not include any usable information or carrying no meaningful or needed content do therefore not have to be stored in the system. Hence, content of soft-bit values may also be implemented as a relevance criteria.

The storage management unit may be adapted for managing the memory unit based on an activity or deactivity state of hybrid automatic repeat request processes. Therefore, a correlation between an activity state of a HARQ process and corresponding or assigned soft-bit values to be stored in the memory unit may be also used for the dynamic management of the distribution and reservation of memory portions.

The storage unit may be dimensioned in accordance with an assumed or predetermined error rate of transmitting the communication message. Therefore, assuming (for instance based on empiricism) that the system should be capable of operating below a specific error rate, the memory may be dimensioned accordingly. For instance, such an assumed error rate may be less than about 50%, particularly less than about 20%, more particularly less than about 10%. Therefore, the memory capacity for the dynamic memory management architecture can be defined in accordance with a desired capability of buffering information to be stored in view of a specific error rate.

The communication device may comprise a transmitter unit adapted for sending a communication message to a communication partner device in accordance with a HARQ protocol. Therefore, the communication device may not only be capable of receiving information, but may allow for a transmission of data and hence for a bidirectional communication with the communication partner device. One example for a system formed by a communication device and a communication partner device is a system formed of a mobile phone and a base station, wherein each one of these two devices may operate as the communication device or as the communication partner device.

The communication device may particularly be adapted for wireless communication. However, also wired communication systems can be operated with the dynamic memory management architecture according to an exemplary embodiment.

For instance, the communication device may be a mobile communication device since such a mobile communication device may be operable with a HARQ protocol. Particularly, the communication device may be a mobile communication terminal. The term "mobile communication terminal" may particularly denote any user equipment (UE). This term may particularly cover mobile phones, data cards for plugging or on-board integration into laptops or personal computers, personal digital assistants (PDAs), navigation systems, etc. However, the communication device may also be a laptop or a personal computer. Hence, portable or stationary communication devices can be operated in accordance with the architecture of exemplary embodiments.

For instance, the communication device may be used in the context of telecommunication, particularly as a mobile phone. It may also be a base station which may be installed fixed within a telecommunication system.

It is also possible that the communication device is a communication station. The term "communication station" may particularly denote any base station of a network, particularly of a radiofrequency network. It may be coupled with one or a plurality of mobile communication terminals. Such a communication station may particularly be a base station. Such a base station may be a central radio transmitter/receiver that may maintain communication with mobile radio telephones within a given range. The communication station may be installed at a fixed or stationary position.

The verification data may comprise forward error correction (FEC) bits, error-detection information (ED) bits, etc. These bits may particularly denote FEC bits and ED bits according to HARQ.

The explicitly described embodiments as well as other embodiments may have at least a part of the following advantages:

- A dynamic HARQ buffer management may serve for enabling dynamic allocation of physical memory resources per active HARQ process.
- In an embodiment, the physical memory may become fragmented with granularity of one HARQ tile. A virtual addressing managed by the HARQ buffer manager may avoid the need for actual moving of data within the memory. In other words, the HARQ buffer manager may assign virtual addresses to available HARQ tiles allocated to a HARQ process so that they appear as of being consecutive, even although they may be arbitrarily scattered in a physical memory.
- The HARQ buffer may be hosted in a physical memory with random access but also in a physical memory adapted for (particularly optimized for) burst access. For the latter, it may be advantageous that a number of tiles is not chosen too large so that maximum burst sizes for access do not become inefficiently small.
- Dynamic allocation and properly defined discarding strategies may allow to exploit statistical gains offered by average error patterns for individual code blocks within one transport block.
- Combination of at least a part of the techniques and the decision criteria disclosed herein may allow to build a user equipment with reduced physical memory need for the HARQ buffer, while still supporting large peak data rates and still obtaining virtually the same 3GPP-compliant data throughput performance (i.e. quality of service) in relevant test cases.
- Nominal HARQ buffer sizes may reach 2 MByte or more soon and may be reduced by 500 kByte or more implementing techniques of exemplary embodiments. This in turn can, with current semiconductor process technologies, result in approximately 4 mm.sup.2 chip area reduction, which again means a significant cost saving of baseband chips.

The aspects defined above and further aspects of the invention are apparent from the examples of embodiment to be described hereinafter and are explained with reference to these examples of embodiment.

BRIEF DESCRIPTION OF THE DRAWINGS

Embodiments of the invention will be described in more detail hereinafter with reference to examples but to which the scope is not limited.

FIG. 8 shows one option of HARQ buffer manager state variables with exemplary state settings according to an exemplary embodiment.

FIG. 9 shows another option of HARQ buffer manager state variables with exemplary state settings according to another exemplary embodiment.

FIG. 10 to FIG. 12 show source code related to HARQ buffer management algorithms for administering physical memory resources, more particularly administering state variables, according to an exemplary embodiment.

FIG. 13 and FIG. 14 show source code related to HARQ buffer management algorithms for memory access which comprises address transformation and memory access control according to an exemplary embodiment.

DETAILED DESCRIPTION

Figure 1:
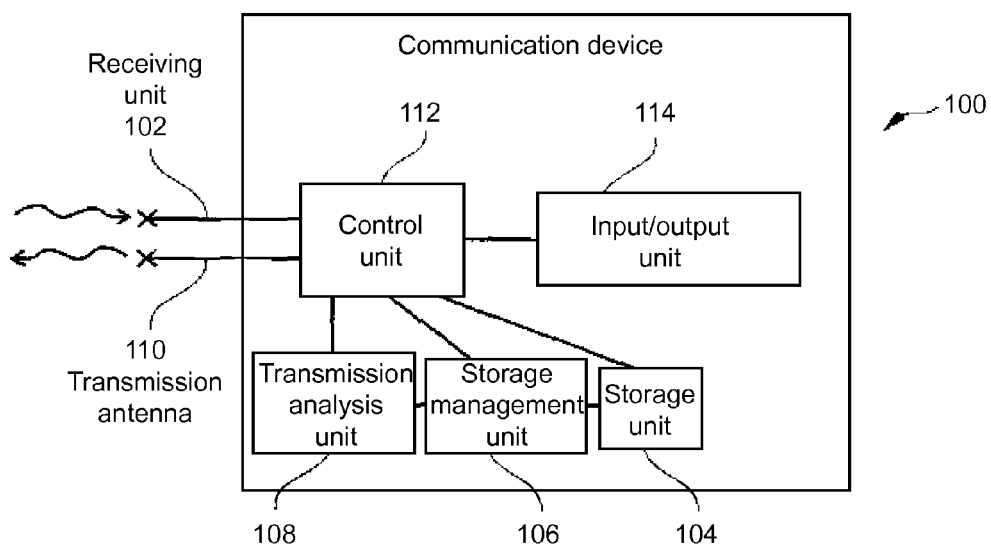
FIG. 1 illustrates a communication system according to an exemplary embodiment.

The illustration in the drawing is schematically. In different drawings, similar or identical elements are provided with the same reference signs.

FIG. 1 illustrates a communication device 100 for communicating in accordance with a hybrid automatic repeat request (HARQ) protocol according to an exemplary embodiment. In an embodiment, the communication device 100 may be operated as a mobile telecommunication terminal such as a mobile phone or a data card.

FIG. 1 shows a control unit 112 which may centrally control operation of the entire communication device 100. Such a control unit 112 may have processing capabilities and may be a CPU (central processing unit) or a microprocessor. In addition to the tasks described herein explicitly, the control unit 112 may control additional tasks of communication device 100 depending on an application (for instance may control signal coding and decoding, signal transducing (i.e. conversion between acoustic and electric signals), signal playback by a speaker, signal detection by a microphone, etc.).

The control unit 112 is coupled for bidirectional data communication with an input/output unit 114 which may be operated by a user. For instance, the input/output unit 114 may comprise input elements such as buttons, a keypad or even a microphone of a voice recognition system. The input/output unit 114 may also comprise output elements such as a display (for instance a liquid crystal display, LCD) for displaying specific information to a human user. By the input/output unit 114, the user may control operation of the communication device 100. In a data card embodiment (not shown), it is possible that the input/output unit 114 does not interface to a human user. It then exposes an electrical interface to a host device, such as a laptop or personal computer.

The communication device 100 comprises a receiving unit 102 such as an antenna adapted for receiving a communication message, for example in a wireless manner, wherein the communication message may include use data and FEC and ED bits.

Furthermore, the communication device 100 comprises a physical storage unit 104 such as a semiconductor memory which may be formed as an integrated circuit. The storage unit 104 may have a storage capacity in the order of magnitude of hundreds of kilobytes and may be adapted for storing particularly the soft-bit values obtained from suitably processing the received communication message. These soft-bit values may be stored temporarily in the storage unit 104. In order words, content or data stored in the storage unit 104 may be continuously updated so as to use the storage unit 104 efficiently and to allow to dimension the storage unit 104 small.

A storage management unit 106 is provided and adapted for dynamically managing storage of the soft-bit values in the storage unit 104 so that soft-bit values which do not fulfil (or which do not fulfil any more) one or more relevance criteria (for instance indicative of the relevance of soft-bit values or groups thereof for processing tasks to be performed in the future) are not maintained stored in the storage unit 104. Therefore, the storage management unit 106 is capable of managing the allocation of memory resources of the memory unit 104 in a time-dependent manner.

The communication device 100 further comprises a transmission analysis unit 108 adapted for analyzing whether a communication message received by the receiving unit 102 has been transmitted entirely or only partially (for instance under poor signal conditions) successfully. Transmission analysis unit 108 may trigger re-transmission of at least a part of the communication message upon determining that the communication message has not been transmitted completely successfully.

The storage management unit 106 is adapted for managing storage of the soft-bit values in the storage unit 104 in such a way that soft-bit values associated with a successfully transmitted portion of the communication message are not maintained stored in the storage unit 104, since their relevance for a further processing is zero. The reason for this is that the corresponding portions of the communication message have already been successfully decoded. The transmission analysis unit 108 is adapted for decoding the communication message using the included soft-bit values.

The storage management unit 106 is adapted for managing storage of the soft-bit values in the storage unit 104 in such a way that a storage capacity of the storage unit 104 reserved for soft-bit values can be released (i.e. can be allowed to be used for other storage tasks) upon determining that these soft-bit values are associated with an already successfully transmitted portion of the communication message. In accordance with this, the storage management unit 106 is further adapted for managing storage of the soft-bit values in the storage unit 104 in such a way that selectively soft-bit values associated with a non-successfully transmitted portion of the communication message are maintained in the storage unit 104 until determining successful re-transmission of this portion by a subsequent communication message. Therefore, soft-bit values which will be later needed for decoding partially unsuccessfully transmitted parts of a previously transmitted communication message may be kept stored in the memory unit 104, whereas soft-bits which are no longer needed can be deleted or reservation of corresponding memory portions may be cancelled.

The storage management unit 106 is further adapted for dynamically splitting (or dynamically partitioning) a storage capacity of the storage unit 104 into a plurality of variable storage sections (or partitions) each associated with one of a plurality of presently managed HARQ processes and for dynamically managing the plurality of storage sections, more particularly managing memory sizes and addresses of the storage sections. Therefore, the sizes of different portions of the storage unit 104 dedicated to specific processes may be changed in size so that no longer needed previously allocated memory resources can be released for other processes and the memory can be used more efficiently.

The storage management unit 106 is adapted for managing a storage capacity of the storage unit 104 by statistically multiplexing various active HARQ processes.

Moreover, the storage management unit 106 can assign priority classes to parts of the storage unit 104 presently associated with parts of HARQ processes and for discarding data parts assigned to a low priority class. Therefore, more important soft-bit values may be maintained stored and less important soft-bit values may be deleted.

The storage management unit 106 may be adapted for assigning a probability of successful transmission to data parts associated with HARQ processes and for discarding parts assigned to a low probability of successful transmission. Therefore, the higher the probability of successful transmission, the higher the probability that corresponding data remain stored.

Less meaningful data can be refused to be stored in the storage unit 104 so that corresponding memory resources may be used for important tasks only. For instance, the storage management unit 106 may refuse storage of zero valued soft-bit values.

In addition, the storage management unit 106 may also manage the memory unit 104 based on an activity/deactivity state of HARQ processes. When a HARQ process is no longer active since it has been completed successfully, corresponding data need not to be stored any longer.

It is possible that the storage unit 104 is dimensioned regarding its maximum storage capacity in accordance with an assumed maximum error rate of a communication channel. For instance, assuming that transmitting a communication message is possible with an error rate of less than 10% allows to dimension the memory unit 104 smaller as compared to an assumption of a higher error rate in which more buffering will be required. The needed capacity of the storage unit 104 allocated for a specific task may be chosen in accordance with operation conditions of a specific application, for instance based on the quality of a communication connection.

As can be taken from FIG. 1, in addition to the receiver antenna 102, there is also a transmission antenna 110 for sending a communication message to a communication partner device (not shown) in accordance with a HARQ protocol. It is also possible that the receiving antenna 102 and the transmission antenna 110 are configured as a common transceiver antenna.

The communicatively coupled communication partner device may or may not implement a corresponding dynamic buffer memory management feature implemented in the communication device 100.

In the following, some basic recognitions of the present inventors will be mentioned based on which exemplary embodiments have been developed.

Exemplary embodiments of the invention relate to dynamic HARQ buffer management which is based on a HARQ compatible communication protocol.

The present inventors have recognized that conventional HARQ protocols may involve a number of drawbacks.

Modern communication systems feature a hybrid automatic repeat request (HARQ) protocol, which requires the storage of so-called soft-bit values for a total number of HARQ processes $N_{HARQ}$. The stored soft-bit values may be used in Viterbi or Turbo decoding (see for instance Chapter 5 in "3GPP TS 36.212, Multiplexing and Channel Coding", Release 8). It is presently believed that the HARQ buffer sizes will reach around 7.2 million or more soft channel bits for relevant telecommunication standards (under the assumption of 300 Mbit/s with 300 kbit transport block set size and 8 HARQ processes with full buffer). If a channel bit shall be resolved by 8 bits, this corresponds to a HARQ buffer memory of 7.2 MByte. This will therefore take a large portion of the chip area, especially in a mobile terminal such as a so-called user equipment (UE) like a mobile phone. Conventionally, the HARQ buffer may be statically split into $N_{HARQ}$ equally sized portions and each HARQ process uses exclusively its dedicated memory area.

In conventional approaches, all soft-bit values used for a transmission are stored until a transmission of a new transport block for the same HARQ process is received, which is triggered by the user equipment (UE) sending a positive acknowledgement after the transmission of the previous transport block in that HARQ process has been finished completely successfully. Thus, the corresponding buffer memory may have a size of several square millimeters on a chip, and may involve large storage capacities of 600 kB or more.

To put a limit on a HARQ buffer, 3GPP introduced limited buffer rate matching and specified total nominal HARQ buffer sizes (see "3GPP TS 36.306, User Equipment (UE) Radio Access Capabilities", Release 8). Such total nominal HARQ buffer sizes can be as large as for instance 3,667,200 soft channel bits. The simple approach of physically implementing the entire nominal HARQ buffer and splitting it into HARQ process areas with identical and static size might be acceptable only under certain circumstances, particularly if all HARQ processes were active with maximum memory size requirement at all time (see sub-section 5.1.4 in "3GPP TS 36.213, Physical Layer Procedures", Release 8).

However, the storage requirement per HARQ process may vary over time due to dynamic transport sizes so that a HARQ process with large memory requirements may benefit from memory unused by other active HARQ processes with smaller memory requirements.

Moreover, it may be rather unlikely that all $N_{HARQ}$ processes are simultaneously active. Considering a target block error rate of 10% for downlink transmission (that is a transmission of a communication message towards a mobile terminal), only approximately $2+N_{HARQ}/10$ processes may be active on long-term average. The number 2 is an implementation dependent estimate for a decoding delay and may account for the storage need for the most recent HARQ process associated with the currently incoming data plus the processing delay in the receive path until the user equipment (UE) knows whether the decoding attempt for data of the earlier HARQ process was successful. In practice, there may be statistical fluctuations around this average due to radio channel fading and noise or interference in the received signal, and/or for other reasons.

It is possible that the initial transmission does not require the full memory for the process. This memory may be allocated later with the re-transmissions for this process. This is especially true in critical medium to high data rate cases and may prevent the actual physical storage of a large number of "zeros".

Moreover, the present inventors have recognized that it may be dispensable to store all the soft-bits belonging to one HARQ process as long as the process is alive. The background of this consideration is that a large transport block is generally composed of C code blocks. The individual code blocks may be decoded independent of each other. A transport block is only successfully decoded if all C code blocks are successfully decoded. However, successful decoding of code blocks may occur at different (re-)transmissions and so the HARQ buffer portion for specific code blocks is not needed once successfully decoded.

As a conclusion of these considerations, the present inventors have recognized that the chip area consuming and therefore valuable HARQ buffer resource may often be "underused". This is especially true if the HARQ parameters are large enough to give room for statistical gains, which is already the case if $N_{HARQ}=8$ or larger as is the case in 3GPP standards (see Chapter 8 in "3GPP TS 36.213, Physical Layer Procedures", Release 8). Also, critically large transport block sizes in 3GPP are so large that they contain C=10 or more code blocks, which again gives room for statistics.

In view of these considerations, exemplary embodiments of the invention intend to make proper use of a limited HARQ buffer in a communication device such as a user equipment (UE), which limited HARQ buffer may be smaller than the nominal HARQ buffer. Consequently, it may become possible to support large peak data rates and fully 3GPP-compliant throughput performance at the same time.

In an embodiment, the communication device may allocate to each HARQ process for which new data is received at the moment a physical HARQ buffer portion of appropriate dynamic size. If the process needs to go into re-transmission due to unsuccessful decoding based on the soft-bits values, at least parts of this memory area may be kept, otherwise it can be (partially or fully) released. Hence, only the actually required memory is occupied so that the required physical memory size can be reduced. This gain may be achieved by statistically multiplexing of active HARQ processes with dynamic size within the HARQ buffer.

A challenge of such a concept is that the sequence of transport block sizes is dynamic. Hence, if one HARQ process becomes inactive and/or frees (parts of) its memory, it may usually not fit perfectly to the memory needs of the next HARQ process to be activated. The HARQ buffer may become fragmented and with off-the-shelf memory access principles, this may require moving of memory content, i.e. garbage collection, which may be time-consuming and may violate possible real-time conditions given by the storage need for continuously incoming data.

In view of these challenges, it will be described in the following how the principle for assigning the HARQ buffer can be modified in order to support the dynamic HARQ buffer management according to exemplary embodiments.

HARQ buffer management may economize on memory by freeing memory areas from physical storage wherever possible. Further, unnecessary storage may be avoided and smart strategies for discarding suitably identified data may be implemented. Zero valued soft-bits may be read back for discarded data.

Particularly, one or more of the following strategies may be implemented for this purpose. These strategies may introduce decision criteria or relevance criteria to allow the system to automatically take decisions in view of an economic memory management:

In an embodiment, it is possible to discard low priority parts in the HARQ buffer. Each HARQ buffer portion associated with a specific HARQ process may be partitioned into multiple, for instance two, partitions with different priorities. One example is partitioning into systematic bits with high priority and parity bits with low priority. This presumes that systematic and parity bits can be separated. Buffer memory management may be based on the priority of data stored in the HARQ buffer.

In an embodiment, it is possible to discard parts of a HARQ buffer portion relating to successfully decoded code blocks in case decoding of a complete transport block has failed.

In an embodiment, it is possible to discard complete HARQ buffer portions associated with processes that are evaluated as having lowest probabilities to succeed. For instance when a probability to succeed to properly transmit a data block due to poor signal quality, the system may decide that no resources are allocated to such processes.

In an embodiment, it is possible to avoid physical storage of zero valued soft-bits values wherever possible, which for instance may be the case for initial transmission with strong puncturing.

One or more of these and other features may be implemented in the communication device 100 shown in FIG. 1.

Figure 2:
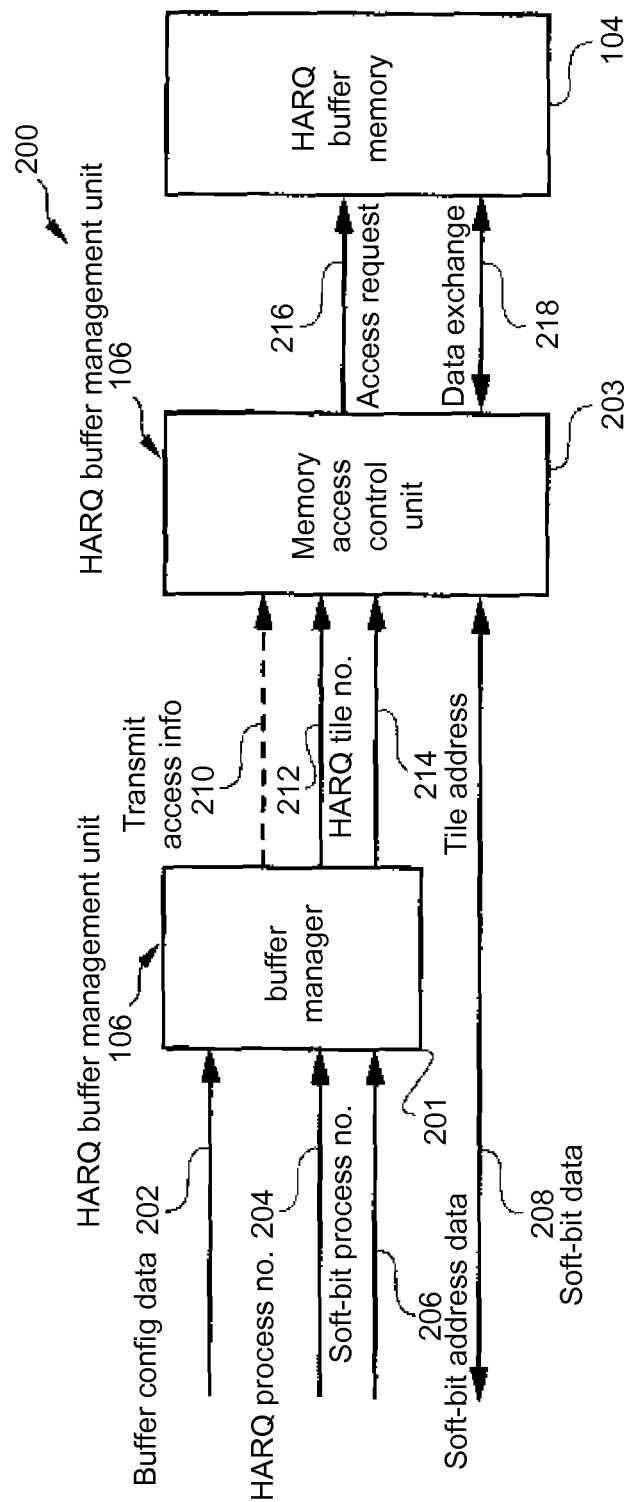
FIG. 2 illustrates a block diagram of a HARQ buffer with HARQ buffer manager controlling the memory access according to an exemplary embodiment.

FIG. 2 illustrates, in accordance with an exemplary embodiment, a block diagram 200 of a HARQ buffer memory 104 (or a physical memory hosting a HARQ buffer) in combination with a HARQ buffer management unit 106 controlling access to the HARQ buffer memory 104.

In FIG. 2, HARQ buffer management unit 106 includes both a HARQ buffer manager 201 and a memory access control unit 203 as separate entities. In another embodiment, the HARQ buffer manager 201 and the memory access control unit 203 may also be combined in a single unit (compare FIG. 7).

In the embodiment of FIG. 2, inputs of the HARQ buffer manager 201 are buffer configuration data 202 (for instance an initialization or allocation or release request). Optionally, HARQ process number data 204 may be input to the HARQ buffer manager via another interface. Also soft-bit address data 206 may be supplied to the HARQ manager 106 via an interface. Soft-bit data 208 may be communicated in a bidirectional manner between the memory access control block 203 and a connected communication partner device (not shown).

HARQ buffer manager 201 and memory access control 203 may be communicatively coupled by three data channels, one of which allowing to transmit access information 210, a second one of which allowing to transmit a HARQ tile number 212, and an address in a tile 214 may be communicated via a third channel.

In addition, the memory access control block 203 may supply physical address for memory access request data 216 to the memory unit 104. Furthermore, a bidirectional data exchange path may be formed between the memory access control block 203 and the memory unit 104 to transmit data 218.

The HARQ buffer may be a dedicated memory area within any kind of physical memory and is able to store $M_{HARQ}$ soft values. The HARQ buffer manager unit 201 administers to $N_{HARQ}$ processes. The HARQ buffer manager 201 treats the HARQ buffer as being virtually partitioned into $N_t \gg N_{HARQ}$ HARQ tiles of size $M_{HARQ}/N_t$ soft values. Each HARQ process may allocate memory corresponding to an integer number of HARQ tiles. In other words, the maximum waste of memory resources due to this granularity is $M_{HARQ}/N_t - 1$ values per HARQ process. The overall wasted fraction of the entire memory is upper bounded by $N_{HARQ}(M_{HARQ}/N_t 1)$ $M_{HARQ} \approx N_{HARQ}/N_t$ (under the reasonable assumption of $M_{HARQ} \gg N_t$) so that it makes sense in existing telecommunications standards with $N_{HARQ}$ in the order of 8 or 16 to choose $N_{HARQ} \ll N_t \approx 250 \ll M_{HARQ}$ in such a way that the number of soft-bit values per tile $M_{HARQ}/Nt$ is exactly a power of 2.

HARQ tiles with 4.096 soft vales therefore are an appropriate choice for HARQ buffers around one million soft-bits. Assuming a rate—⅓ channel code, this tile size corresponds to a granularity of $4096/3 \approx 1365$ information (also called transport block) bits for the HARQ processes. Still smaller tiles reduce HARQ tile granularity at the cost of increased table storage in the HARQ buffer manager 201.

Per transmission time interval, the HARQ buffer manager 201 may be re-configured by a software based on the information about (portions of) HARQ processes becoming activated and deactivated. This means releasing all HARQ tiles allocated for a HARQ process in case the decoding attempt for its associated data was entirely successful—or given up—as well as allocating HARQ tiles for a HARQ process associated with the currently ongoing new data transmission. Additionally, the HARQ buffer manager 201 can be configured to release memory for individual successfully decoded code blocks even if the HARQ process is still active.

In an embodiment, the HARQ buffer management unit 201 assigns the HARQ tiles, as available, in increasing order of availability to the HARQ processes. Other assignment strategies are possible. The tile assignment for each active HARQ process is stored in one or several tables so that the HARQ buffer manager 201 can quickly do the allocation as well as the translation from virtual address represented by HARQ process number plus soft-bit address to the physical address represented by HARQ tile number plus address within the HARQ tile. The latter finally maps (optionally with an address of said) to an address in the physical memory containing the HARQ buffer.

So far, the access to physically stored data has been considered. For access to not actually stored data, the following technique may be applied. Memory access control is in many cases in charge of for instance feeding zero valued soft-bit data for read access or dumping of data for write access in case that some additional dedicated lines with access information instructs a system to do so (see dashed arrow 210 in FIG. 2). Alternatively, an invalid tile number can be used instead of the dedicated lines to force the feeding of zero valued soft values as read data or dumping of write data.

Next, discarding strategies which may be implemented according to exemplary embodiments of the invention will be explained in more detail.

First, partial discarding of a HARQ buffer will be explained.

The HARQ buffer may be divided into a mandatory area (high priority) and an optional area (low priority).

Figure 3:
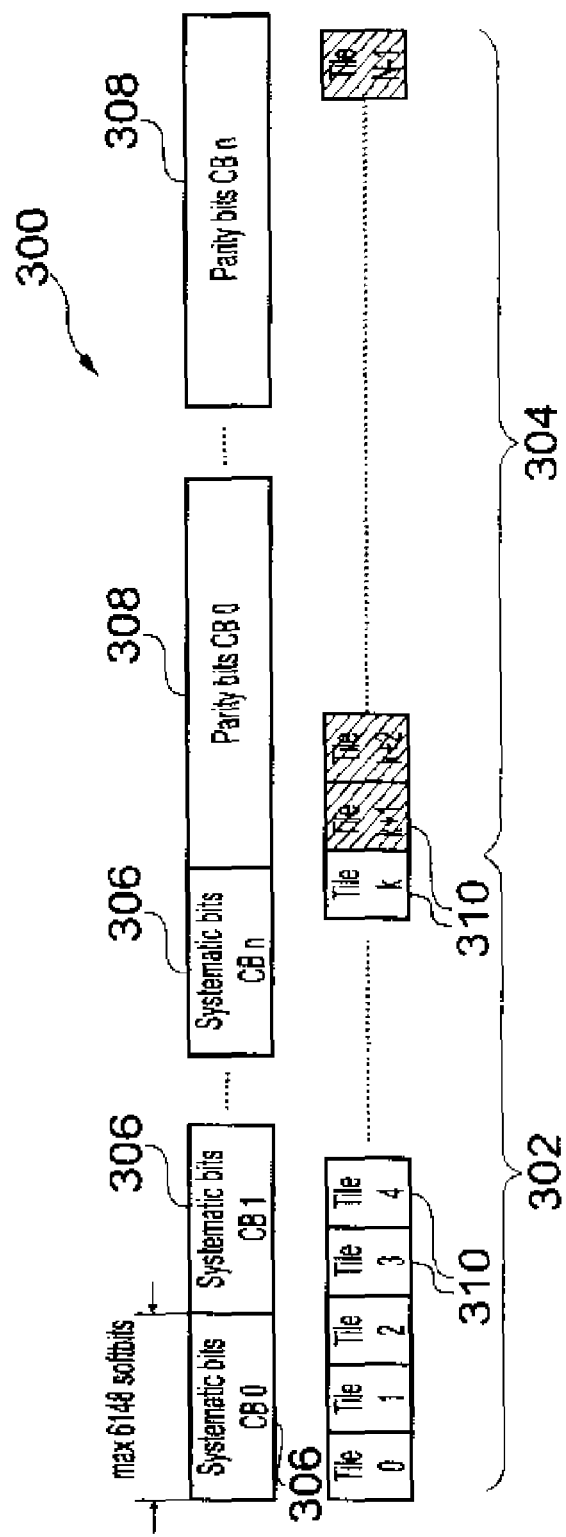
FIG. 3 and FIG. 4 illustrate partial discarding with systematic and parity separation according to exemplary embodiments.

Such a strategy is illustrated in a data structure 300 shown in FIG. 3 which separates mandatory tiles 302 from optional tiles 304. Individual tiles are denoted with reference numeral 310.

Optional tiles 304 can be de-allocated by the HARQ buffer management unit 201 when the memory runs out and assigned to other processes. The soft-bits stored in these optional tiles 304 may be automatically replaced by zeros if the corresponding process intends to read data from a de-allocated block. An embodiment may associate systematic bits 306 to the mandatory area 302 and parity bits 308 to the optional area 304. Such a procedure is reasonable from a performance point of view since it may be advantageous to discard tiles 310 which contain only parity bits 308. This can be done by separating the systematic bits 306 from the parity bits 308.

Figure 4:
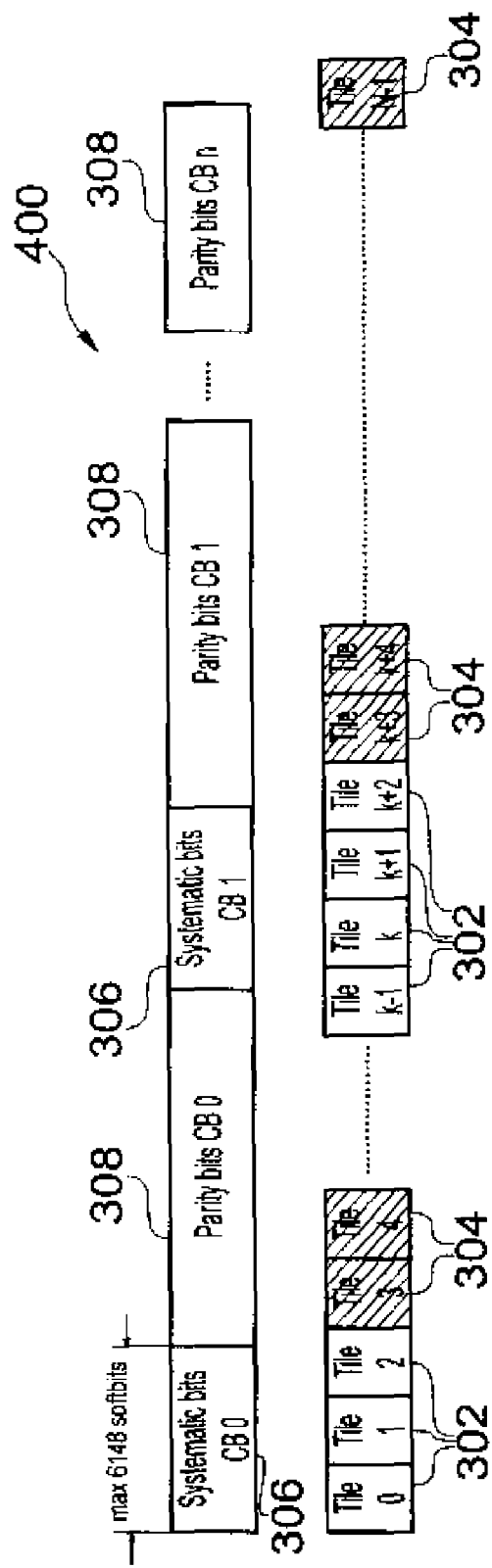

Alternatively, it is possible to use an easy algorithm which searches for tiles 310 with high content of parity bits 308, as shown in a data structure 400 shown in FIG. 4.

Partial discarding makes sense for large HARQ processes including large code block sizes K, where $M_{HARQ}/N_t<K$, otherwise it may happen under undesired circumstances that complete code blocks are discarded, which would disturb an error-free decoding of the transport block.

In still another embodiment, it is possible to discard selected HARQ process buffers. Hence, another option is to discard complete HARQ process buffers based on a quality measure. This quality measure may reflect the probability for this HARQ process to get successfully decoded in the next re-transmission. An example for such a measure is the Hamming distance of systematic bits at decoder input and output.

Additionally or alternatively, it is possible to discard successful code blocks (for instance selectively) in still active HARQ process buffers.

In such an embodiment, a HARQ process may stay active until the complete transport block has been decoded successfully. Typically, a transport block may be composed of a set of code blocks. It is quite likely that there are successfully decoded code blocks within a transport block even if the complete transport block was not successfully transmitted. In this case, it is much more memory efficient to store the decoded code block (decoder output) instead of the soft-bits including parity part (decoder input). Hence, in such an embodiment, the HARQ buffer manager 201 may release memory for successfully decoded code blocks of still active HARQ processes.

The present inventors have simulated HARQ buffer statistics of physically allocated HARQ tiles for a basic embodiment of HARQ buffer management. In this simple model, always the full buffer is allocated per process when a new transport block is received. After a decoding delay of 2 ms, the HARQ buffer portions related with the successfully decoded code blocks may be released.

At most 303 HARQ tiles of 2 kByte size, each, are used to represent the HARQ buffer for user equipment category 3 in LTE (long-term-evolution). Transmission with always C=9 code blocks per transport block and full per HARQ process buffer need for $N_{HARQ}=16$ are assumed for the model. The channel model corresponds to a transmission scenario with no fading dips in time direction.

Figure 5:
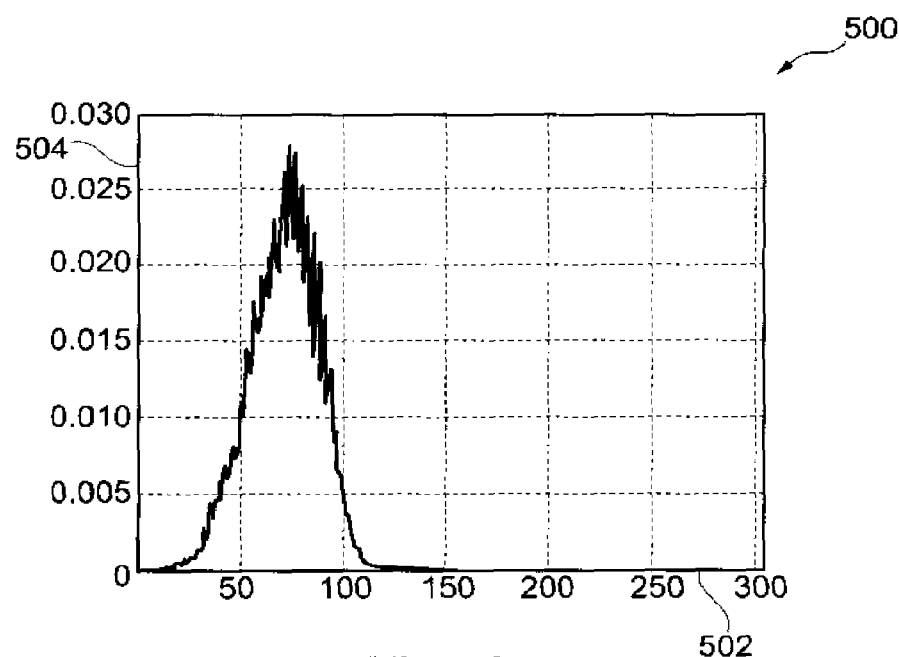
FIG. 5 illustrates a diagram showing a correlation between a number of allocated physical tiles of a buffer memory and a probability density function.
Figure 6:
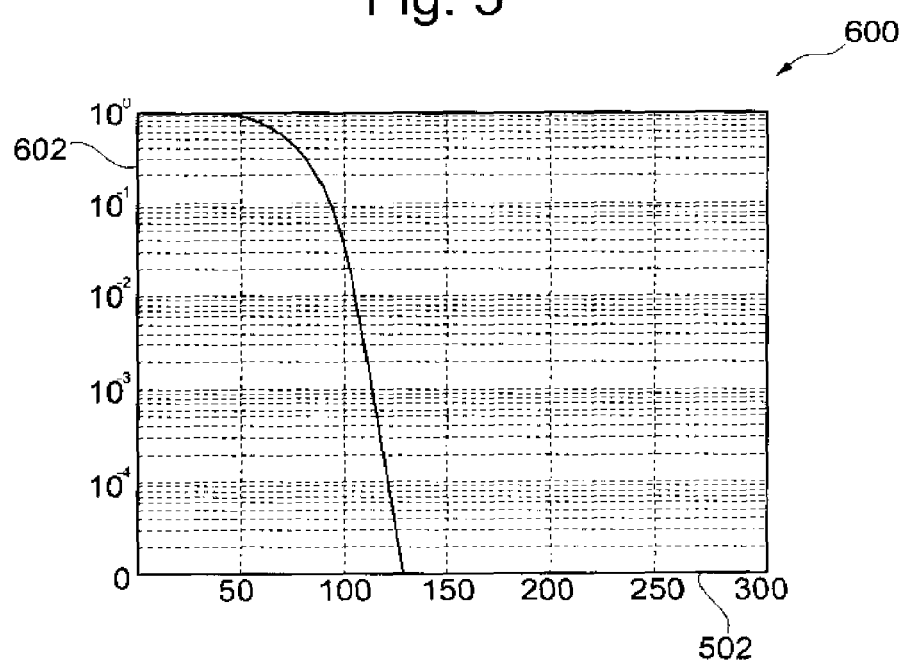
FIG. 6 illustrates a diagram showing a correlation between a number of allocated physical tiles and a complementary cumulative distribution function.

FIG. 5 and FIG. 6 illustrate results of such a model for a target transport block error rate of 50% (which means 7.4% code block error rate with a simplified assumption of statistical independence).

FIG. 5 shows a diagram 500 having an abscissa 502 along which a number of allocated physical tiles is plotted. Along an ordinate 504, a probability density function is plotted.

In a similar way, a diagram 600 shown in FIG. 6 has an abscissa 502 and an ordinate 602 showing a complementary cumulative distribution function.

It can be seen from FIG. 5 and FIG. 6 that rarely more than 120 HARQ tiles are allocated at the same time. This means that almost ⅔ of HARQ buffer, i.e. approximately 400 kByte, does not need to be physically present in this scenario.

Time variant channels with fading dips may require more HARQ buffer to be physically present, but it seems to be reasonable to state that a significant saving of 200 kByte is possible in many cases in UE category 3.

Exemplary embodiments may particularly be applied in the context of LTE (long-term-evolution) specific assumptions and usage. In LTE, the classification of code blocks into successfully decoded and non-successfully decoded is very simple, since a code block CRC (Cyclic Redundancy Check) may be present. This allows for allocating or releasing HARQ memory for individual code blocks. Independent of this, allocation or release can even be done on smaller units like regions of systematic bits and parity bits within a code block.

ssuming a simple allocation scheme with code block granularity, HARQ buffer for a particular code block may, in an embodiment, be kept only until successful decoding. Even if the entire transport block is still in error, individual code blocks may be declared as successful, which may free memory for other HARQ processes.

Figure 7:
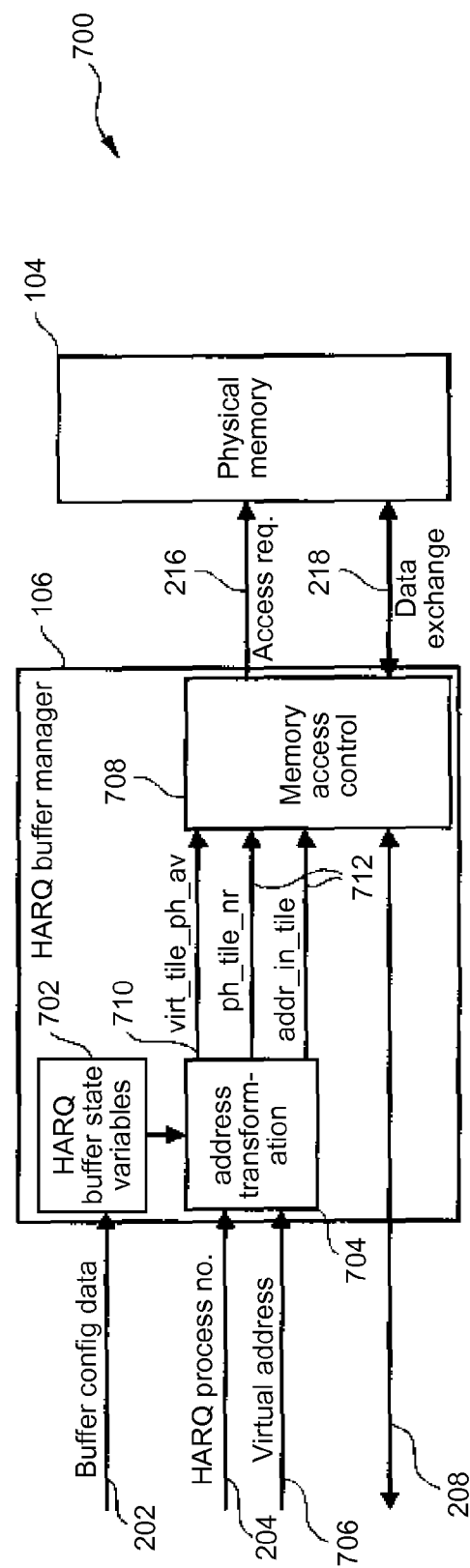
FIG. 7 illustrates a block diagram of HARQ buffer in some physical memory with HARQ buffer manager administering and controlling memory access according to an exemplary embodiment.

An overall architecture 700 is shown in FIG. 7 which can be considered as an alternative to the implementation of FIG. 2. However, other functional splits are possible than in the embodiments of FIG. 2 or FIG. 7.

Referring to FIG. 7, a HARQ buffer manager state variables block 702 of the HARQ buffer manager 106 may be considered as a configuration interface configurable when a new transport block is input to the system 700. A transport block may enter via a communication path denoted with the reference numeral 208. An address transformation block 704 fed with an optional HARQ process number 204 and fed with a virtual address 706 can receive data as well from the HARQ buffer manager state variables block 702 and may supply memory access control block 708 with different kinds of data (see reference numerals 710, 712). An indicator on physically available tiles (see reference numeral 710) may be supplied to the memory access control block 708 as well as data indicative of a physical address (see reference numeral 712). Tiles may be considered as separate memory portions of the physical memory 104 which may have a size of, for instance 1 kByte to 2 kByte. Data connected with the streams 710, 712 control the memory access control unit 708.

Per transmission time interval, the HARQ buffer manager 106 may be reconfigured by software based on information about (portions of) HARQ processes becoming activated and deactivated. This means releasing all HARQ tiles allocated for a HARQ process in case the encoding attempt for its associated data was entirely successful—or given up—as well as allocating HARQ tiles for a HARQ process associated with the currently ongoing new data transmission. Additionally, the HARQ buffer manager 106 can be configured to release memory for individual successfully decoded code blocks even if the HARQ process is still active. In an embodiment, the HARQ buffer manager 106 assigns the HARQ tiles—as available—in increasing order of availability to the HARQ processes. Any other proper assignment strategy can be also implemented.

The tile assignment for each active HARQ process may be stored in at least one table so that the HARQ buffer manager 106 can quickly perform the allocation as well as the translation from virtual address (see reference numeral 706, can also be represented by HARQ process number plus soft-bit address) to the physical address (see reference numeral 216) represented by physical tile number plus address within the HARQ tile (see reference numeral 712). The latter finally maps (for instance via an address of said) to an address (see reference numeral 216) in the physical memory 104 containing the HARQ buffer.

Hence, the access to physically stored data has been considered. For access to not actually stored data, the following technique may be used. Memory access control is in charge of for instance feeding zero valued soft-bit data for read access or dumping of data for write access in case that the virtual tile is physically not available. To force memory access control to feed zero valued soft values as read data or dumping of write data, the dedicated line virt_tile_ph_available can be used (first option) or an invalid physical tile number can be used (second option).

FIG. 8 shows a diagram 800 indicative of state variables used for a HARQ buffer management implementation in which the dedicated line virt_tile_ph available is used (first option), with an explicit array for hbm.virt_tile_ph_available. The HARQ buffer manager 106 can also be implemented differently, but the described first option may be considered to be efficient in terms of accessing and managing the memory. Hence, FIG. 8 shows HARQ buffer management state variables with exemplary state settings.

When physical tiles shall be allocated to a specific interval and virtual address range (for instance for storage of a code block), a loop over all virtual tiles may be performed to check in hbm.virt_tile_ph_available whether the virtual tile is already physically available. If yes, only the associated semaphore hbm.ph_tile_sema[.] is incremented, otherwise an available physical tile (that is one with semaphore equal to zero) needs to be found and allocated, which leads to semaphore becoming equal to one. The physical tile number is entered at the location for the virtual tile into hbm.ph_tile_nr[.] and hbm.num_ph_tiles_allocated is incremented.

FIG. 8 also shows an exemplary state setting for the HARQ buffer manager 106 in which five physical 2 kByte tiles are allocated to virtual address range. The situation can for instance result in a HARQ buffer manager 106 providing storage for four code blocks scattered in virtual address range. There is one isolated code block to either end and two consecutive code blocks in the middle which share one tile. Such a double allocation of a physical tile by two code blocks is visible from the semaphore value equal to 2. Other semaphores for physical tiles with single allocation have a value equal to one.

FIG. 9 shows a block diagram 900 indicative of state variables needed for the HARQ buffer manager implementation according to the second option (using an invalid physical tile number) which in this example indicates unavailable tiles via hbm.ph_tile_nr=511.

FIG. 10 to FIG. 12 show HARQ buffer manager algorithms for administering the physical memory resource which basically means administering the state variables. FIG. 13 and FIG. 14 give HARQ buffer manager algorithms needed for memory access which comprises address transformation and memory access control. More specifically, FIG. 10 relates to HBM_init, FIG. 11 relates to HBM_alloc, FIG. 12 relates to HBM_release, FIG. 13 relates to HBM_write_mem, and FIG. 14 relates to HBM_read_mem.

It should be noted that the term "comprising" does not exclude other elements or features and the "a" or "an" does not exclude a plurality. Also elements described in association with different embodiments may be combined.

It should also be noted that reference signs in the claims shall not be construed as limiting the scope of the claims.

What is claimed is:

1. A communication device configured to communicate in accordance with a hybrid automatic repeat request protocol, the communication device comprising:
a receiving unit configured to receive a transport block comprising one or more portions;
a transmission analysis unit configured to determine soft-bit values corresponding to each of the portions, wherein the determined soft-bit values are for use in decoding a corresponding portion;
a storage unit configured to store soft-bit values; and
a storage management unit configured to cause the storage unit to selectively store some of the determined soft-bit values in dependence on a future relevance of the determined soft-bit values in decoding a portion of the transport block.

2. The communication device according to claim 1, wherein the storage management unit is configured to cause the storage unit to only maintain the determined soft-bit values corresponding to one or more of the portions that were unsuccessfully decoded.

3. The communication device according to claim 2, wherein the transmission analysis unit is configured to cause retransmission of one or more of the unsuccessfully decoded portions.

4. The communication device according to claim 3, wherein, in response to receiving a retransmission of an unsuccessfully decoded portion, the transmission analysis unit is configured to decode the retransmitted portion at least in part on the basis of the determined soft-bit values corresponding to the unsuccessfully decoded portion.

5. The communication device according to claim 2, wherein the storage management unit is configured to cause the storage unit to selectively maintain the determined soft-bit values corresponding to one or more of the unsuccessfully decoded portions until successful decoding thereof.

6. The communication device of claim 1, wherein the storage management unit is configured to prevent storage of one or more of the portions that were successfully decoded in the storage unit.

7. The communication device according to claim 1, wherein the storage management unit is configured to:
allocate a segment of memory for soft-bit values corresponding to each of at least some of the portions; and
cause the storage unit to release one or more said segments of memory allocated to one or more of successfully decoded portions.

8. The communication device according to claim 1, wherein the storage management unit is further configured to maintain groups of soft-bit values corresponding to different hybrid automatic repeat request processes in different sections of the storage unit, each said section having a size.

9. The communication device according to claim 8, wherein the storage management unit is configured to dynamically manage the sizes of the sections.

10. The communication device according to claim 1, wherein the storage management unit is further configured to estimate required storage capacity for maintaining soft-bit values on the basis of an output of statistical multiplexing of a plurality of active hybrid automatic repeat request processes.

11. The communication device according to claim 1, wherein the storage management unit is further configured to assign one of a plurality of priority classes to each of different parts of an hybrid automatic repeat request process and to maintain soft-bit values associated with different parts on the basis of a priority class associated therewith.

12. The communication device according to claim 11, wherein the storage management unit is configured to prevent storage of soft-bit values corresponding to one or more of the parts associated with a low priority class.

13. The communication device according to claim 11, wherein the storage management unit is configured to prevent storage of soft-bit values corresponding to the portion if the probability is below a predefined threshold.

14. The communication device according to claim 1, wherein the storage management unit is further configured to assign a probability indicative of the likelihood of successful decoding of a portion and to maintain the determined soft-bit values corresponding to the portion in dependence on the assigned probability.

15. The communication device according to claim 1, wherein the storage management unit is configured to prevent storage of zero-valued soft-bit values in the storage unit.

16. The communication device according to claim 1, wherein the storage management unit is further configured to manage the storage unit based on an activity status of hybrid automatic repeat request processes.

17. The communication device according to claim 1, wherein the storage management unit is configured to reserve a segment of the storage unit for the determined soft-bit values corresponding to the transport block in accordance with an assumed maximum error rate associated with a corresponding communication channel.

18. The communication device according to claim 17, wherein the assumed maximum error rate is less than 50%.

19. The communication device according to claim 1, wherein the hybrid automatic repeat request protocol comprises at least one of an IEEE 802.16 protocol, a 3GPP standard universal terrestrial radio access protocol, a high-speed packet access protocol, an evolved universal terrestrial radio access protocol, and a long-term evolution protocol.

20. The communication device according to claim 1, wherein the transport block further comprises forward error correction bits and/or error-detection information bits for use in decoding one or more of the portions.

21. The communication device according to claim 1, further comprising a transmitter unit configured to transmit a further transport block in accordance with the hybrid automatic repeat request protocol.

22. The communication device according to claim 1, wherein the communication device comprises at least one of a wireless communication device and a wired communication device.

23. The communication device according to claim 1, wherein the communication device comprises one of a mobile communication device, a portable communication device, a mobile terminal, a mobile phone, a data card, a Personal Digital Assistant, a computer, a laptop, and a base station.

24. A method of communicating in accordance with a hybrid automatic repeat request protocol, the method comprising:
receiving a transport block comprising one or more portions;
determining soft-bit values corresponding to each of the portions, wherein the determined soft-bit values are for use in decoding a corresponding portion; and
selectively storing some of the determined soft-bit values in dependence on a future relevance of the determined soft-bit values in decoding a portion of the transport block.

25. A non-transitory computer-readable medium, in which a communication computer program in accordance with a hybrid automatic repeat request protocol is stored, which computer program, when being executed by a processor, is configured to:
receive a transport block comprising one or more portions;
determine soft-bit values corresponding to each of the portions, wherein the determined soft-bit values are for use in decoding a corresponding portion; and
selectively store some of the determined soft-bit values in dependence on a future relevance of the determined soft-bit values in decoding a portion of the transport block.

* * * * *